United States Patent [19]

Morimoto

[11] Patent Number: 4,784,021
[45] Date of Patent: Nov. 15, 1988

[54] CONTROL SYSTEM FOR A INFINITELY VARIABLE TRANSMISSION

[75] Inventor: Yoshihiko Morimoto, Mitaka, Japan

[73] Assignee: Fuji Jukogyo Kabushiki Kaisha, Tokyo, Japan

[21] Appl. No.: 847,378

[22] Filed: Apr. 2, 1986

[30] Foreign Application Priority Data

Jun. 29, 1985 [JP] Japan ................................. 60-143465

[51] Int. Cl.⁴ ............................................. B60K 41/12
[52] U.S. Cl. ........................................ 74/868; 74/877
[58] Field of Search ................. 74/867, 868, 866, 877, 74/878

[56] References Cited

U.S. PATENT DOCUMENTS

| 4,475,416 | 10/1984 | Underwood | 74/868 |
| 4,543,077 | 9/1985 | Yamamoro et al. | 74/866 X |
| 4,561,327 | 12/1985 | Niwa et al. | 74/866 |
| 4,584,907 | 4/1986 | Niwa et al. | 74/866 |
| 4,610,183 | 9/1986 | Nobumoto et al. | 74/867 X |
| 4,663,991 | 5/1987 | Nakamura et al. | 74/868 |

Primary Examiner—Leslie A. Braun
Assistant Examiner—Dwight G. Diehl
Attorney, Agent, or Firm—Martin A. Farber

[57] ABSTRACT

A control system for an infinitely variable transmission has a transmission ratio control valve having a spool for controlling oil supplied to a cylinder of a drive pulley to change the transmission ratio. The deceleration rate of the motor vehicle contianing the system is detected to produce a deceleration signal. By controlling the oil pressure supplied to the transmission ratio control valve in accordance with engine operating conditions and the deceleration signal, the spool is shifted such that downshifting speed is increased with increasing deceleration.

8 Claims, 8 Drawing Sheets

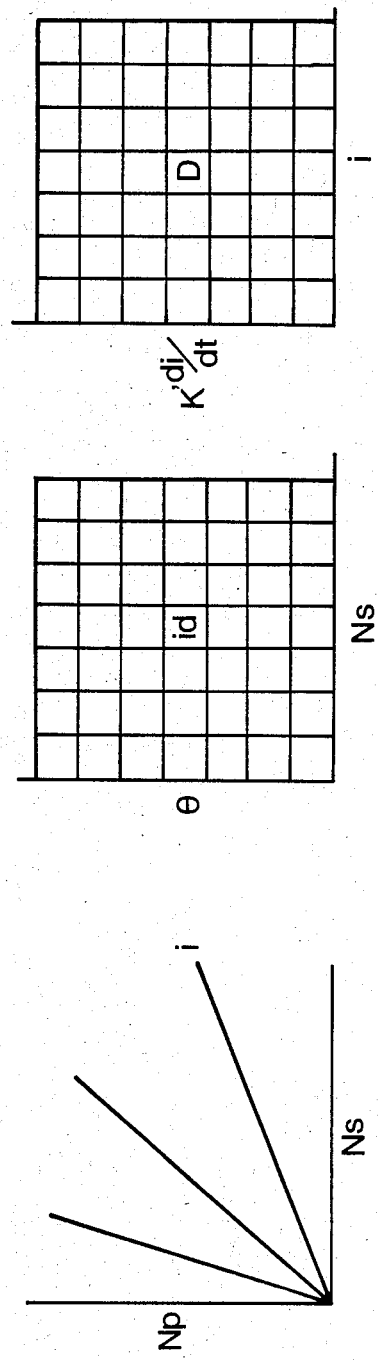

CONTROL SYSTEM FOR A INFINITELY VARIABLE TRANSMISSION

BACKGROUND OF THE INVENTION

The present invention relates to a control system for an infinitely variable belt-drive automatic transmission for a motor vehicle, and more particularly to a system for controlling the speed of changing the transmission ratio in accordance with driving conditions of the vehicle.

A known control system for an infinitely variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The output of the engine is transmitted to the drive pulley trough a clutch such as an electromagnetic clutch. The line pressure is controlled to prevent the belt from slipping on the pulleys in order to transmit the output of the engine.

When starting the vehicle, the transmission ratio is set at a maximum value. When the vehicle speed and engine speed reach set values under a driving condition, the transmission ratio starts to change (to upshift). At that time if the engine speed is kept constant, the transmission ratio is automatically and continuously reduced at a speed which is determined by line pressure, the pressure of oil supplied to the servo device of the drive pulley, and the actual transmission ratio. In such a system, the speed of changing of transmission ratio up to a desired transmission ratio can not be controlled in accordance with driving conditions. Accordingly, hunting or overshooting of the transmission ratio occurs, which decreases the driveability of the vehicle.

Japanese Patent Laid Open No. 59-208255 discloses a system for controlling the transmission ratio changing speed. In the system, the transmission ratio changing speed (downshifting speed) is increased when a brake pedal is depressed. However, the speed is constant irrespective of the degree of the pedal depression. Accordingly, the control operation does not effect proper engine braking, causing excessive or deficient engine braking.

SUMMARY OF THE INVENTION

The object of the present invention is to provide a system which controls the transmission ratio changing speed (downshifting speed) in accordance with deceleration of a motor vehicle. According to the present invention, the downshifting speed increases with deceleration.

In accordance with the present invention, the transmission ratio control valve has chambers at both ends of the spool, and a solenoid operated on-off control valve is provided for controlling the amount of oil supplied to the chambers of the transmission ratio control valve. The system is provided with sensing means for sensing operating conditions of the engine and the transmission and for producing signals dependent on the conditions, a deceleration rate detecting means for producing a deceleration signal, a control unit responsive to the signals from the sensing means and the deceleration signal for producing an output signal for operating the control valve, such that downshifting speed of the transmission is increased with an increase of the deceleration.

The other objects and features of this invention will become understood from the following description with reference to the accompanying drawings.

BRIEF DESCRIPTION OF DRAWINGS

FIG. 4a shows various transmission ratios;

FIGS. 4b and 4c are tables storing the desired transmission ratio (id) and duty ratio (D);

DETAILED DESCRIPTION OF THE PREFERRED EMBODIMENT

Figure 1:
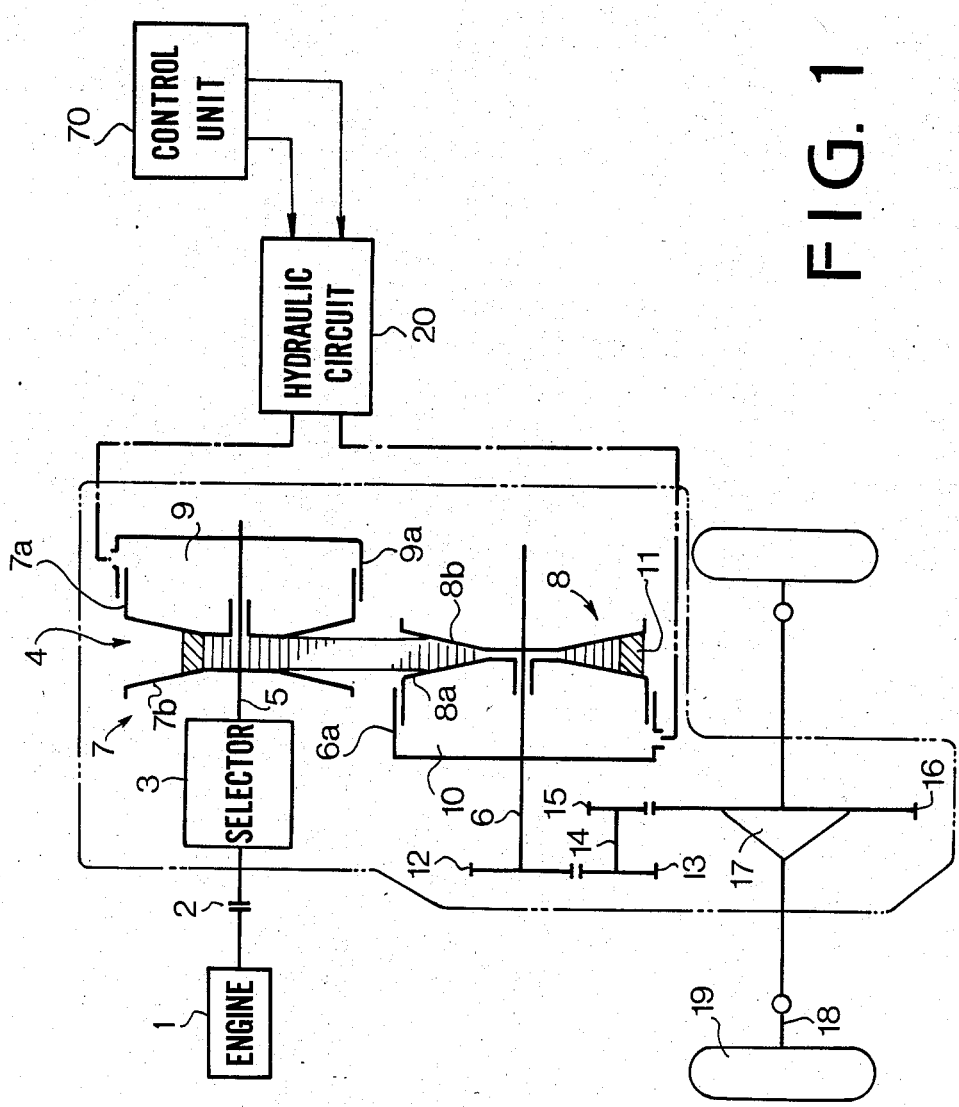
FIG. 1 is a schematic illustration of an infinitely variable belt-drive transmission.

Referring to FIG. 1, an infinitely variable belt-drive automatic transmission for a motor vehicle to which the present invention is applied comprises an electromagnetic powder clutch 2 for transmitting the power of an engine 1 to a transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a has a cylindrical portion which is slidably engaged in a cylinder 6a formed on the output shaft 6 to form a servo device. A chamber 10 of the servo device is also communicated with hydraulic circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of the vehicle driving wheels 19 through a differential 17.

Figure 2A:
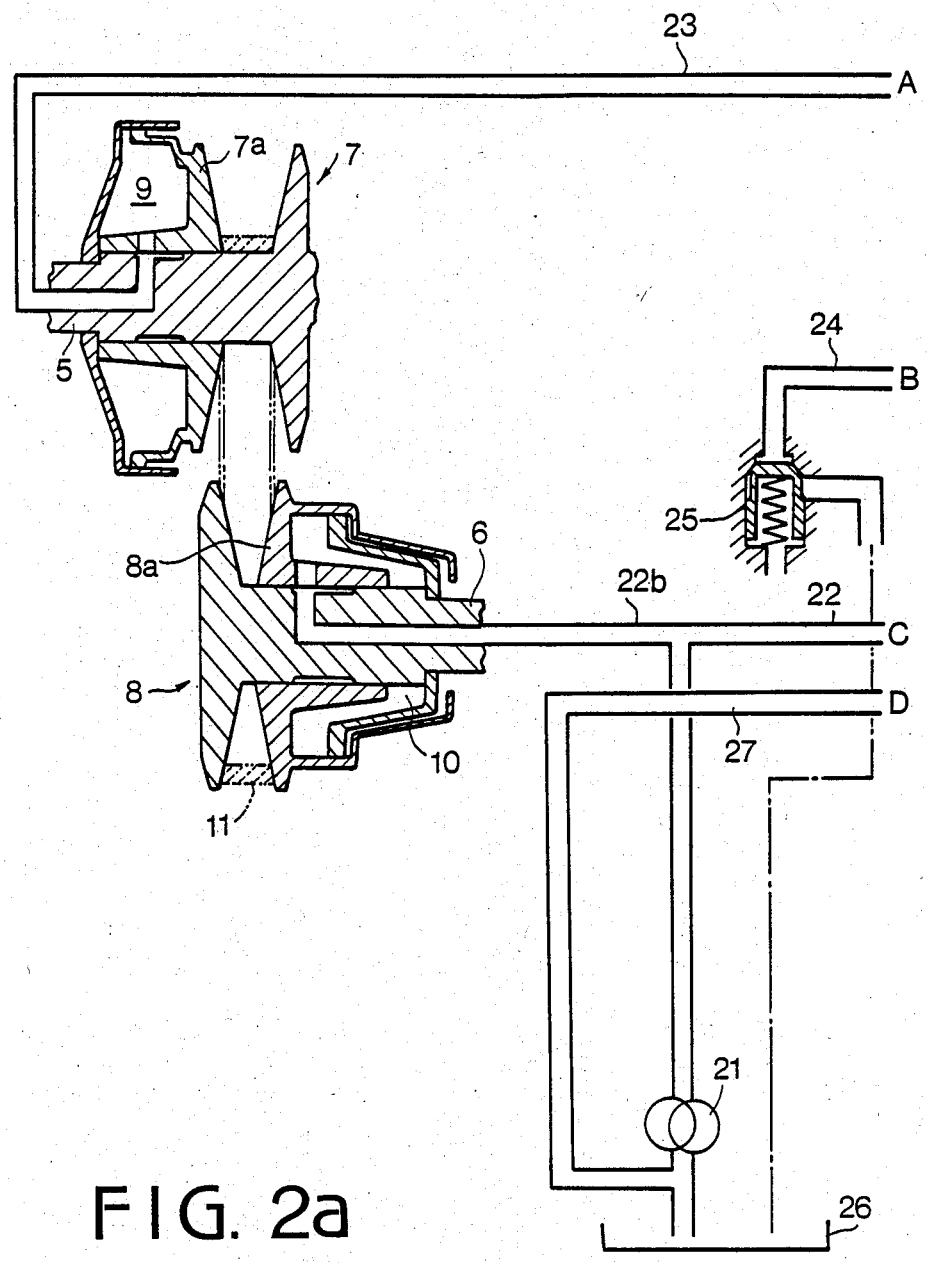
FIGS. 2a and 2b are schematic diagrams showing a control system according to the present invention.
Figure 2B:
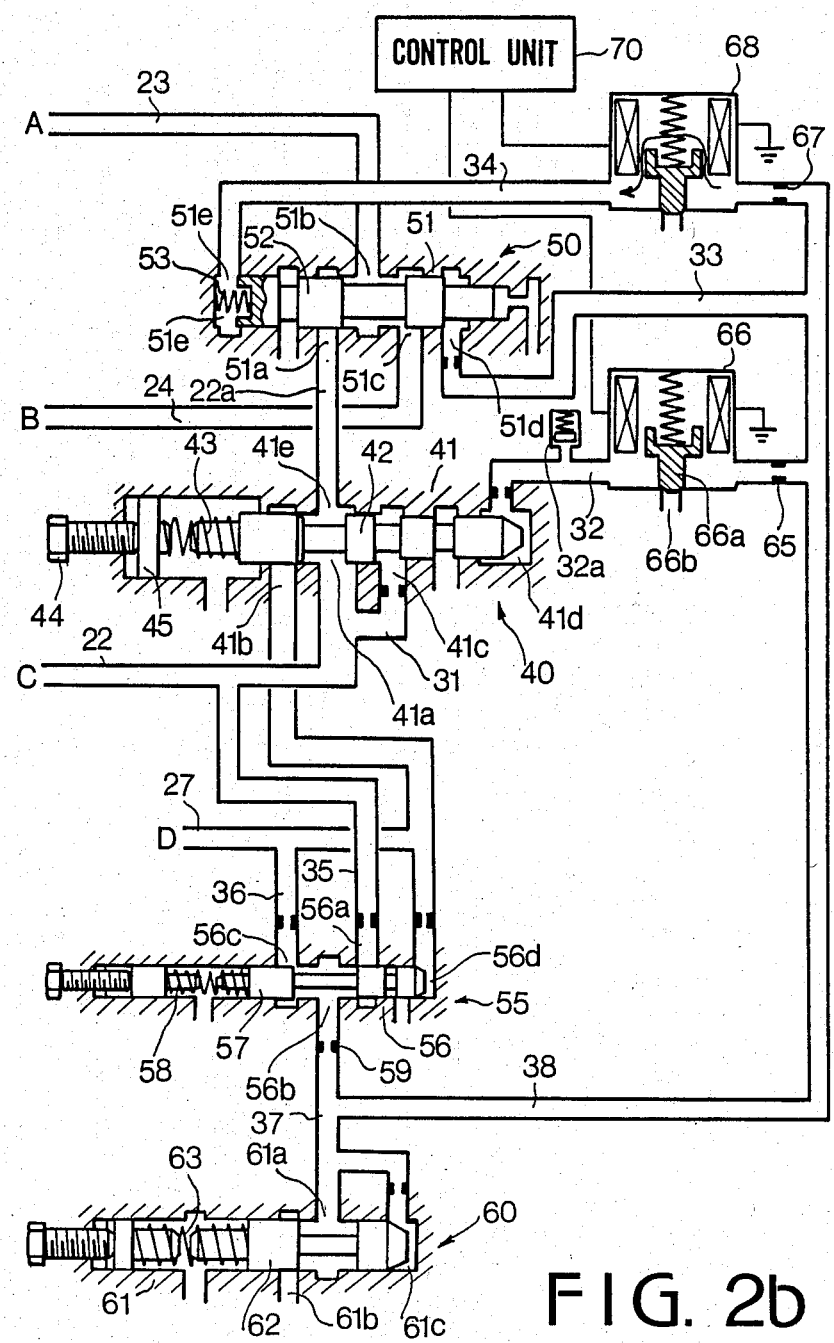

Referring to FIGS. 2a and 2b, the chamber 9 of the drive pulley 7 is applied with pressurized oil by a first hydraulic circuit comprising an oil pump 21 from an oil reservoir 26 passing through a line pressure conduit 22, ports 41a and 41e of a line pressure control valve 40, a transmission ratio control valve 50, and a conduit 23. The chamber 10 of the driven pulley 8 is applied with pressurized oil through the first hydraulic circuit including a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the pressure of a spring 43 provided between the end of the spool and a retainer 45, the position of which is adjustable by a screw 44. The port 41a is communicated with a port 41b of a drain passage 27 in accordance with the position of a land of the spool 42.

The transmission ratio control valve 50 comprises a valve body 51, spool 52, and a spring 53 for urging the spool in the downshift direction. A port 51b of the valve body 51 is selectively communicated with a pressure oil supply port 51a or a drain port 51c in accordance with the position of lands of the spool 52. The port 51b communicates with the chamber 9 through a conduit 23, and port 51a communicates with the line pressure control valve 40 through conduit 22a. The drain port 51c is communicated with the oil reservoir 26 through a check valve 25. The drain port 41b of control valve 40 communicates with oil reservoir 26 through conduit 27.

The system of the present invention is provided with a regulator supply valve 55, regulator valve 60, and solenoid operated on-off control valves 66 and 68. The regulator supply valve 55 comprises a valve body 46, spool 57, spring 58 for urging the spool in a direction, port 56a connected to line pressure conduit 22 through passage 35, port 56c connected to the drain passage 27 through a passage 36, and an end chamber 56d which is communicated with the drain passage 27 to be applied with the drain oil pressure opposite the spring 58. When the line pressure is at a high level, the pressure of the drain oil is at a low level because of closing the port 41b of the line pressure control valve 40. In such a state, spool 57 is shifted to the right to communicate port 56a with an output port 56b. On the other hand, when the pressure of the drain oil becomes higher than a set value, the spool 57 is shifted to the left, causing port 56c to communicate with port 56b. Thus, a sufficient amount of oil is supplied to the regulator valve 60 through an orifice 59 and passage 37.

The regulator valve 60 comprises a valve body 61, spool 62, end chamber 61c, spring 63 urging the spool 62 to the chamber 61c. When the pressure of supplied oil becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid operated on-off valve 66, and passage 32 having an accumulator 32a. Further, the passage 38 is communicated with an end chamber 51d of the transmission ratio control valve 50 through a passage 33, and with another end chamber 51e through a passage 34, orifice 67, and solenoid operated on-off valve 68. The passages 32–34, 37, 38 comprise a second hydraulic circuit. The solenoid operated on-off valve 66 is adapted to be operated by pulses. When energized, a valve 66a opens a drain port 66b. The pulsation of the pressure of oil in the passage 32 is smoothed by orifice 65. The solenoid operated valve 68 is the same as valve 66 in construction and operation. The control valves 66 and 68 are operated by signals from a control unit 70. Thus, pressure controlled by the control valves 66 and 68 is applied to the chambers 41d, and 51e.

In the line pressure control valve 40, the relationship between spring load $F_S$ and line pressure Pl, line pressure receiving area $S_a$ of the spool, control pressure $P_d$ in the chamber 41d, and control pressure receiving area $S_d$ is as follows:

$$F_s = Pl \cdot S_a + P_d \cdot S_d$$

$$Pl = (F_s - P_s \cdot S_d)/S_a$$

Accordingly, the line pressure Pl is inverse proportion to the control pressure $P_d$.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, and zero by controlling the duty ratio of the pulses for operating the control valve 68. The transmission ratio control valve 50 is so arranged that the spool 52 is at a neutral position at a middle duty ratio (for example 50%) and is located in an oil supply position by increasing the duty ratio from the middle duty ratio because of the reduction of the control pressure in the chamber. Further, the speed of the movement of the spool increases with decreasing duty ratio. The spool is shifted to an oil drain position by decreasing the duty ratio. It will be understood that when the oil is supplied to the chamber 9, the transmission is upshifted.

The relationship between the duty ratio of the pulses applied to the solenoid operated control valve 68 and the transmission ratio is explained hereinafter.

The necessary volume V of oil in the chamber 9 is a function of transmission ratio i, namely:

$$V = f(i)$$

The flow rate Q is obtained by differentiating the volume V with respect to time and expressed as $$Q = dV/d/t = df(i)/di \times di/dt$$

$$di/dt = f(Q, i)$$

The supply flow rate $Q_s$ and drain flow rate $Q_d$ are presented as $$\begin{aligned} Q_d &= C \cdot S_d((2gP_p)/\gamma)/2 \\ &= a \cdot S_d(P_p)/2 \\ Q_s &= a \cdot S_s(Pl - P_p)/2 \\ a &= c(2g/\gamma)/2 \end{aligned}$$

where
$P_p$ is the pressure in chamber 9,
Pl is the line pressure,
C is the coefficient for the flow rate,
g is the acceleration of gravity, γ is the specific gravity of oil,
$S_s$ is the opening area of the supply port 51a, and,
$S_d$ is the opening area of drain port 51c.

Designating by D the duty ratio of the pulses applied to the control valve, that is the ratio of ON/OFF of the valve, average flow rate Q in one cycle (oil supply state is positive) is $$Q = a(D \cdot S_s(Pl - P_p)/2 - (1-D) \times S_d(P_p)/2)$$

Assuming a, $S_s$ and $S_d$ to be constants, $$Q = f(D \cdot Pl \cdot P_p)$$

The line pressure Pol is determined by the transmission ratio i and engine torque, and the pressure $P_p$ in the chamber 9 is decided by the transmission ratio i and the line pressure Pl. Accordingly, assuming the engine torque to be constant,
$Q = f(D, i)$
Since $di/dt = f(Q, i)$
$di/dt = f(D, i)$
$D = f(di/dt, i)$ Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = K(id - i)$$

where K is a coefficient

Accordingly, if the transmission ratio changing speed di/dt is determined, the duty ratio D can be obtained from the speed. When the actual transmission ratio i is larger than the desired transmission ratio id (i>id), the value of di/dt is negative. In such a state, the duty ratio D is increased to reduce the pressure in the chamber 51e so as to upshift the transmission. The downshift is performed in the reverse manner. It is preferable to correct the coefficient K by the changing rate $\dot{\theta}$ of the opening degree $\theta$ of the throttle valve of the engine.

Figure 3A:
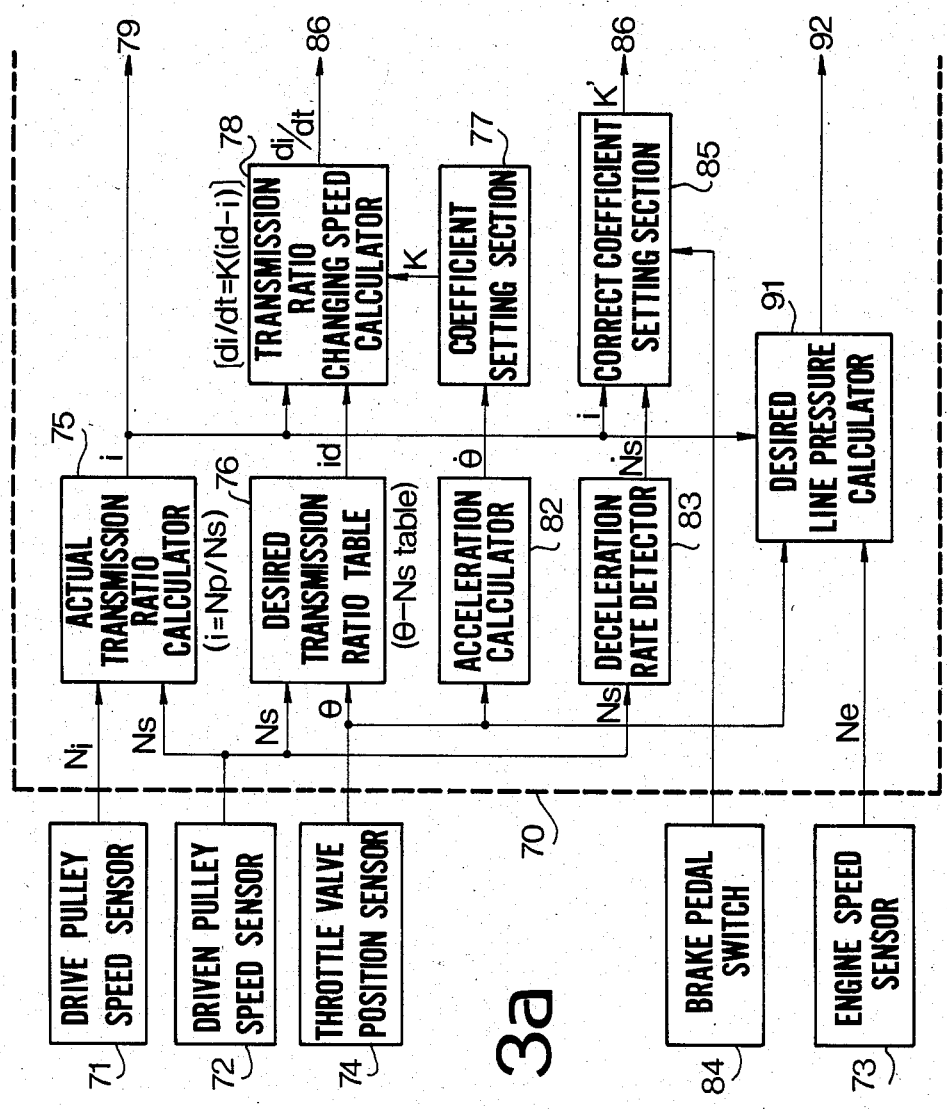
FIGS. 3a and 3b are block diagrams showing a control unit.
Figure 3B:
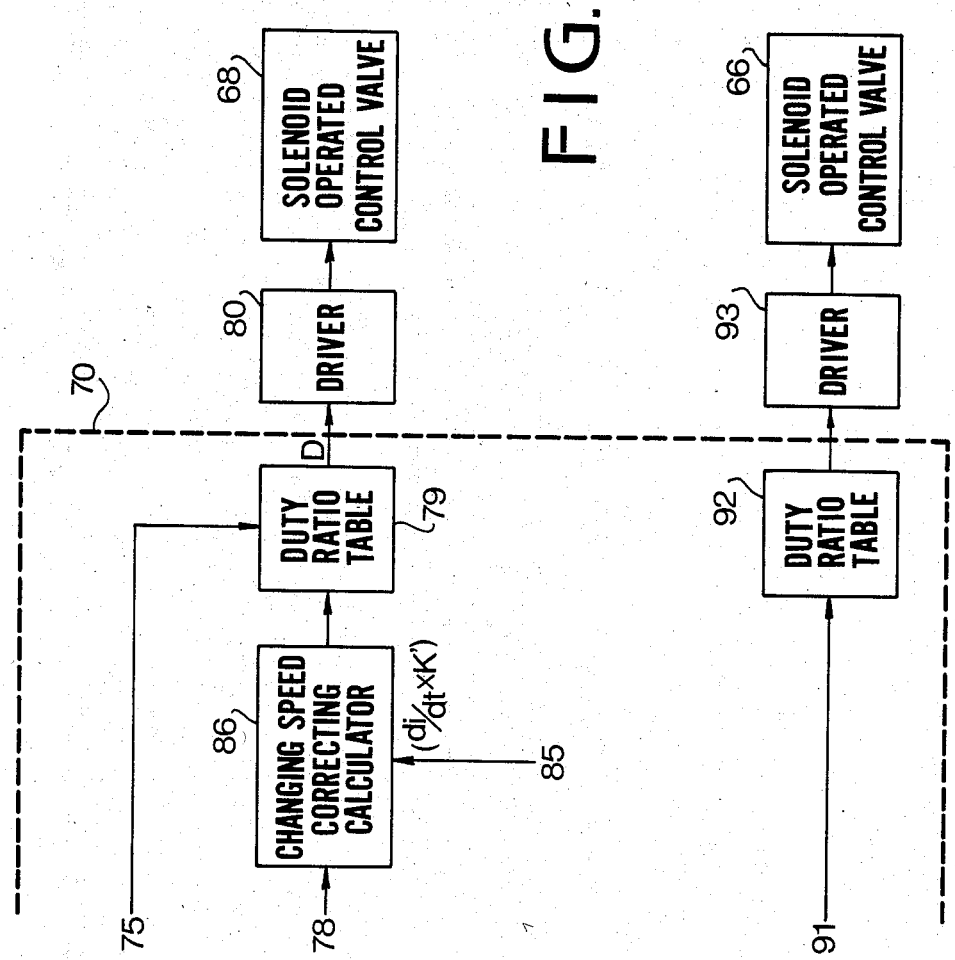

Referring to FIGS. 3a and 3b, the system is arranged to control the transmission ratio in accordance with above-described principle. In the system, a drive pulley speed sensor 71, a driven pulley speed sensor 72, an engine speed sensor 73 and a throttle valve position sensor 74 are provided. Output signals $N_p$ and $N_s$ of the sensors 71 and 72 which are dependent on the speed of the drive pulley and drive pulley are fed to an actual transmission ratio calculator 75 to produce an actual transmission ratio i in accordance with $i = N_p/N_s$. Output signals $N_s$ of the sensor 72 and $\theta$ (dependent on the throttle valve position) of the throttle valve position sensor 74 are fed to a desired transmission ratio table 76. FIG. 4a shows various actual transmission ratios i and FIG. 4b shows the table 76. The desired transmission ratio id is fetched from the table 76 in accordance with the signals $N_s$ and $\theta$. On the other hand, the output $\theta$ (throttle position signal) is fed to an acceleration calculator 82 to obtain an acceleration signal $\dot{\theta}$ dependent on the angular acceleration of the throttle valve. The acceleration signal $\dot{\theta}$ is supplied to a coefficient setting section 77 so as to correct the coefficient to produce a corrected coefficient K. The actual ratio i, desired ratio id and the coefficient K from the coefficient setting section 77 are applied to a transmission ratio changing speed calculator 78 to produce a transmission ratio changing speed (rate) di/dt from the formula $di/dt = K(id - i)$.

Figure 4D:
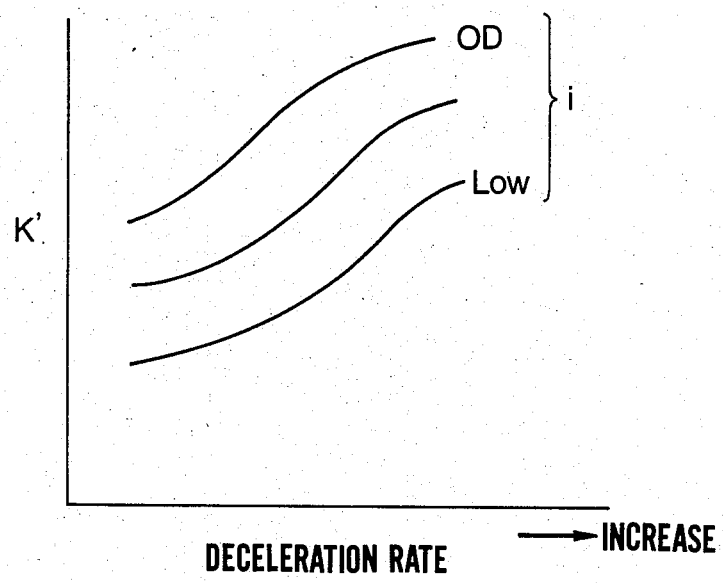
FIG. 4d is a graph showing a correcting coefficient as a function of deceleration rate for various transmission ratios.

In accordance with the invention, the output signal $N_s$ of the sensor 72 is fed to a deceleration rate detector 83 to obtain deceleration rate of the vehicle, and a brake pedal switch 84 is provided to produce a brake signal when a brake pedal of the vehicle is depressed. The output signal of the actual transmission ratio calculator 75, deceleration rate detector 83 and the brake pedal switch 84 are supplied to a correct coefficient setting section 85 to produce a correcting coefficient K'. The coefficient K' (1>K') increase with an increase of the deceleration rate as shown in FIG. 4d. The coefficient K' changes also in accordance with the actual transmission ratio i (in FIG. 4d, LOW is a large transmission ratio and OD is overdrive).

The correcting coefficient K' is applied to a changing speed correcting calculator 86 where the transmission ratio changing speed di/dt is corrected by calculation of $di/dt \times K'$.

The corrected speed di/dt K' and the actual transmission ratio i are applied to a duty ratio table 79 to derive the duty ratio D. FIG. 4c shows the duty ratio table in which the duty ratio decreases with increases of the corrected speed $di/dt \times K'$ and the transmission ratio i. The duty ratio D is supplied to the solenoid operated valve 68 through a driver 80.

On the other hand, an output signal Ne (dependent on engine speed) of the engine speed sensor 73, the throttle position signal $\theta$ and the actual ratio i are fed to a desired line pressure calculator 91 to produce the desired line pressure Pl. The desired line pressure Pl is applied to a duty ratio table 92 to derive a duty ratio dependent on the desired line pressure. The duty ratio is applied to the solenoid operated valve 66 through a driver 93. The duty ratio is set to increase with an increase of the line pressure.

In operation, while the vehicle is at a stop, the chamber 10 of the driven pulley is supplied with line pressure through conduit 22b, and the chamber 9 of the drive pulley is drained, since $N_p$, $N_s$, $\theta$, and the duty ratio are zero, so that the spool 52 is at the right end position. Thus, in the pulley and belt device of the infinitely variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and is further transmitted to axles of the driving wheels 19. Thus, the vehicle is started.

At that time the line pressure is at the highest value by the pressure regulator valve 60, since the duty ratio for the valve 66 is large, and the spool 42 of the control valve 40 is at the right end position. When the throttle valve is opened for acceleration, the desired transmission ratio id and the transmission ratio changing speed di/dt are determined or calculated by the units 76, 78. The transmission ratio changing speed di/dt is corrected by the coefficient K' at the calculator 86 to produce the corrected transmission ratio changing speed $di/di \times K'$. The duty ratio corresponding to the transmission ratio changing speed is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9. On the other hand, the duty ratio for the control valve 66 is reduced, thereby shifting the spool 42 of the valve 40 to the left. Thus, the line pressure reduces, and the transmission is upshifted. As the difference between the desired ratio id and the actual ratio i becomes large, the duty ratio for the control valve 68 becomes large, thereby increasing the transmission ratio changing speed di/dt. When the opening degree of the throttle valve is reduced for deceleration, the duty ratio is reduced, thereby shifting the spool 52 to the right to drain the chamber 9. Thus, the transmission ratio is downshifted. The transmission changing speed at downshifting increases with reduction of the duty ratio.

When the vehicle is accelerated at steady state, the acceleration signal $\dot{\theta}$ increases to increase the coefficient K. Accordingly, the transmission is quickly downshifted, thereby promoting the acceleration.

Figure 5:
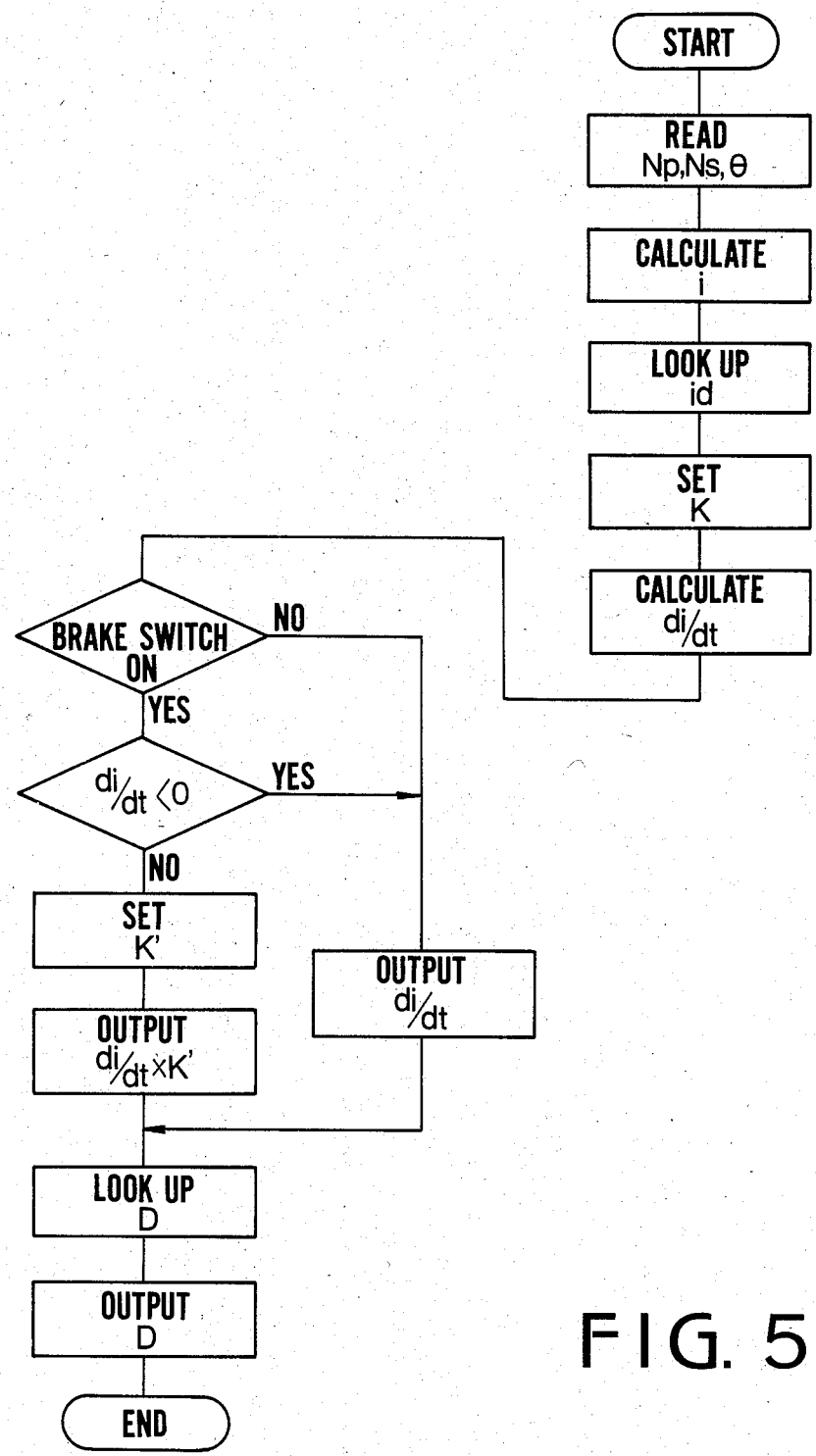
FIG. 5 is a flowchart showing the operation of the system.

When the brake pedal is depressed the coefficient K' is increased as the deceleration rate increases and the actual transmission ratio i reduces. Thus, the transmission is quickly downshifted to increase the engine braking effect. FIG. 5 shows the above described operation.

Since the downshifting speed is increased with an increase of deceleration of the engine, engine braking properly is effected on the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for an infinitely variable transmission for transmitting power of an internal combustion engine to driving wheels of a motor vehicle, the transmission having a drive pulley including a hydraulically shiftable first disc and a first hydraulic cylinder for shifting the first disc, a driven pulley including a hydraulically shiftable second disc and a second hydraulic cylinder for operating the second disc, and a belt engaged with both pulleys, the system including a first hydraulic circuit having an oil pump of the vehicle and for supplying oil to the first and second hydraulic cylinders, and a transmission ratio control valve disposed in the first hydraulic circuit and having a shiftable spool so as to control the oil being supplied to the first hydraulic cylinder of the drive pulley to change the transmission ratio of the transmission, the improvement in the system comprising:

a second hydraulic circuit having a pressure regulator valve means communicating with said pump for maintaining pressure of oil supplied by the pump as control oil at a constant value, the second hydraulic circuit for supplying the control oil to the transmission ratio control valve so as to shift the spool;

control valve means provided in the second hydraulic circuit for controlling the amount of the control oil supplied to the transmission ratio control valve so as to shift the spool;

first means for detecting actual transmission ratio of the transmission and for producing a transmission ratio signal dependent on the detected transmission ratio;

second means for detecting magnitude of deceleration of the motor vehicle and for producing a deceleration signal dependent on said magnitude;

a control unit responsive to the transmission ratio signal and to the deceleration signal for producing a control signal; and said control valve means being responsive to the control signal for increasing the amount of the control oil supplied to the transmission ratio control valve for increasing shifting speed of the spool in a downshifting direction with increasing magnitude of the deceleration.

2. The control system according to claim 1, wherein the control valve means is a solenoid operated on-off valve, and the control signal of the control unit comprises pulses, the duty ratio of which is changed so as to control the transmission ratio changing rate.

3. The control system according to claim 1, further wherein said control unit includes a correct setting section responsive to said deceleration signal and to said transmission ratio signal for increasing the transmission ratio changing rate in the downshifting direction with increasing magnitude of the deceleration and with decreasing actual transmission ratio.

4. The control system according to claim 3, further comprising a brake pedal switch for operating said correct setting section when a brake of the vehicle is depressed.

5. The control system according to claim 3, further comprising a throttle valve position sensor for sensing the opening degree of a throttle valve of the engine as a condition of the engine representing a desired transmission ratio, and said control unit is further responsive to said throttle valve position sensor to provide an intermediate signal representing a transmission ratio changing rate dependent on the difference between said actual transmission ratio and the desired transmission ratio, said correct setting section provides a coefficient, means for multiplying said intermediate signal by said coefficient producing said control signal.

6. The control system according to claim 1, wherein said control valve means is responsive to said control signal from said control unit for increasing the amount of the control oil supplied to the transmission ratio control valve increasing the transmission ratio and its rate of change with decreasing transmission ratio.

7. A control system for an infinitely variable transmission for transmitting power of an internal combustion engine to driving wheels of a motor vehicle, the transmission having a drive pulley including a hydraulically shiftable first disc and a first hydraulic cylinder for shifting the first disc, a driven pulley including a hydraulically shiftable second disc and a second hydraulic cylinder for operating the second disc, and a belt engaged with both pulleys, the system including a first hydraulic circuit having a pump for supplying oil to the first and second hydraulic cylinders, and a transmission ratio control valve disposed in the first hydraulic circuit and having a shiftable spool so as to control the oil being supplied to the first hydraulic cylinder of the drive pulley to change the transmission ratio of the transmission, the improvement in the system comprising:

a second hydraulic circuit for supplying the oil as control oil to the transmission ratio control valve so as to shift the spool;

control valve means provided in the second hydraulic circuit for controlling the amount of the control oil supplied to the transmission ratio control valve so as to shift the spool;

first means for detecting actual transmission ratio of the transmission and for producing a transmission ratio signal dependent on the detected transmission ratio;

second means for detecting deceleration of the vehicle and for producing a deceleration signal as a changing function of and dependent on the value of the deceleration;

a control unit responsive to the transmission ratio signal and to the deceleration signal for producing an output signal being sent to and for operating the control valve means such that shifting of the spool, its speed and the transmission ratio and its rate of change in a downshifting direction are continuously increased as a changing function of increasing deceleration.

8. The control system according to claim 7, wherein said control valve means is responsive to said output signal from said control unit for increasing the amount of the control oil supplied to the transission ratio control valve increasing the transmission ratio and its rate of change with decreasing transmission ratio.

* * * * *